(12) United States Patent
Criswell

(10) Patent No.: US 11,275,299 B2
(45) Date of Patent: Mar. 15, 2022

(54) DISPENSER WITH PROJECTOR

(71) Applicant: BUCKEYE INTERNATIONAL, INC., Maryland Heights, MO (US)

(72) Inventor: Scott Michael Criswell, Saint Charles, MO (US)

(73) Assignee: BUCKEYE INTERNATIONAL, INC., Maryland Heights, MO (US)

(*) Notice: Subject to any disclaimer, the term of this patent is extended or adjusted under 35 U.S.C. 154(b) by 43 days.

(21) Appl. No.: 16/643,679

(22) PCT Filed: Sep. 7, 2018

(86) PCT No.: PCT/US2018/049909
§ 371 (c)(1),
(2) Date: Mar. 2, 2020

(87) PCT Pub. No.: WO2019/051200
PCT Pub. Date: Mar. 14, 2019

(65) Prior Publication Data
US 2020/0201164 A1    Jun. 25, 2020

Related U.S. Application Data

(60) Provisional application No. 62/555,953, filed on Sep. 8, 2017.

(51) Int. Cl.
*A47K 5/00* (2006.01)
*H04N 9/31* (2006.01)
(Continued)

(52) U.S. Cl.
CPC ............... *G03B 29/00* (2013.01); *A47K 5/00* (2013.01); *G03B 21/145* (2013.01)

(58) Field of Classification Search
CPC ...... G03B 29/00; G03B 21/00; G03B 21/145; A47K 5/00; A47K 5/10; A47K 5/12; H04N 9/3173
See application file for complete search history.

(56) References Cited

U.S. PATENT DOCUMENTS 3,319,835 A   5/1967  Ensign et al.
5,347,324 A   9/1994  Sasaki et al.
(Continued)

FOREIGN PATENT DOCUMENTS

JP    2013080316 A    5/2013

OTHER PUBLICATIONS

International Search Report for International Application No. PCT/US2018/049909, dated Jan. 8, 2019, 4 pages.
(Continued)

*Primary Examiner* — Ryan D Howard
(74) *Attorney, Agent, or Firm* — Armstrong Teasdale LLP

(57) ABSTRACT

A dispenser having a projector is disclosed. The projector has a body with a cavity sized and shaped to receive a battery, a lens holders sized and shaped to receive at least one lens for focusing an image, a first protrusion sized and shaped to be received by a first wall of the dispenser, and a second protrusion sized and shaped to be received by a second wall of the dispenser. The projector further includes a lens assembly, a lamp, and a circuit board. The lens assembly is disposed in the lens holder, the lamp is configured to project a light through the lens assembly, and the circuit board is in electrical communication with the lamp.

15 Claims, 9 Drawing Sheets

(51) Int. Cl.
    *G03B 29/00* (2021.01)
    *G03B 21/14* (2006.01)

(56) References Cited

U.S. PATENT DOCUMENTS

| | | |
|---|---|---|
| 6,439,723 B1 | 8/2002 | Tano |
| 2005/0133100 A1 | 6/2005 | Bolderheij et al. |
| 2005/0237735 A1 | 10/2005 | Fan |
| 2006/0226250 A1 | 10/2006 | Elliott et al. |
| 2009/0308887 A1 | 12/2009 | Woo et al. |
| 2012/0085780 A1* | 4/2012 | Landauer ............ A47K 5/12 222/52 |
| 2014/0118708 A1* | 5/2014 | Kadotani ............ H05K 1/189 353/119 |
| 2015/0108299 A1 | 4/2015 | Seal |
| 2017/0215655 A1 | 8/2017 | Ophardt et al. |

OTHER PUBLICATIONS

Written Opinion of the International Searching Authority for International Application No. PCT/US2018/049909, dated Jan. 8, 2019, 5 pages.

Supplementary European Search Report for EP Application 18854374.8 dated Apr. 21, 2021; 2 pp.

\* cited by examiner

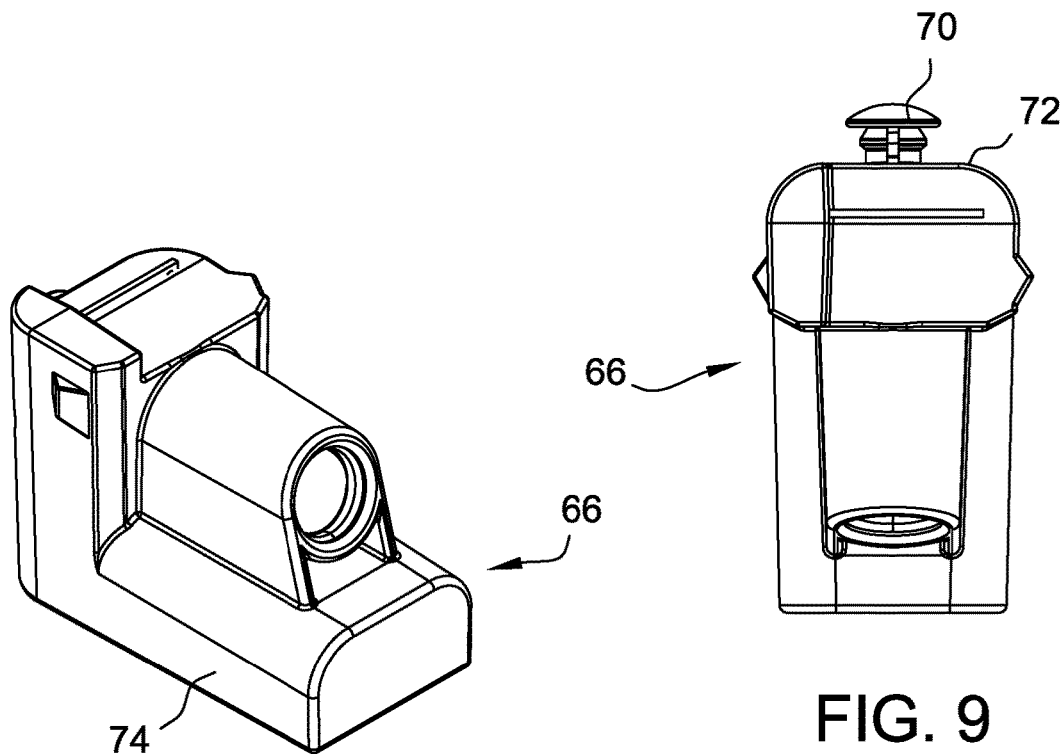
FIG. 8
FIG. 9
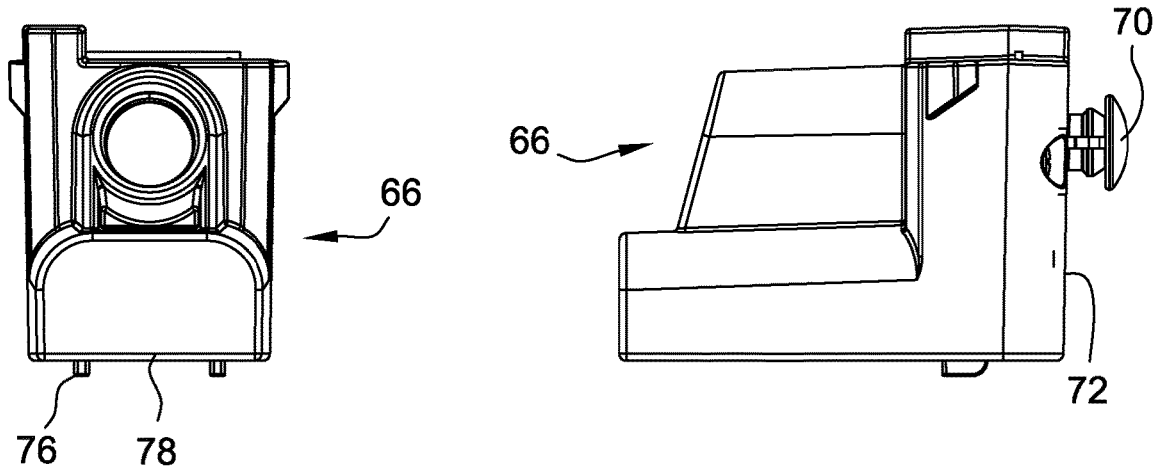
FIG. 10
FIG. 11

DISPENSER WITH PROJECTOR

CROSS-REFERENCE TO RELATED APPLICATION

This application is a U.S. National Phase Application of PCT/US2018/049909, filed Sep. 7, 2018, which claims the benefit of priority to U.S. Provisional Application No. 62/555,953, filed Sep. 8, 2017, the contents of which are hereby expressly incorporated by reference in their entirety.

FIELD

The field of the present disclosure generally relates to dispensers and more particularly to a fluid dispenser having an integrated projector.

BACKGROUND

Fluid dispensers for storage and distribution of personal products (e.g., soap, hand sanitizer, lotion) and other suitable fluids are well known in the art and are often mounted to a wall. For example, fluid dispensers are often mounted in public restrooms, hospital rooms, and other spaces to encourage the use of the product contained in the dispenser. The dispenser may be decorated or have markings identifying the liquid contained in the dispenser. Additionally, the dispenser may have some indicia of how to use the dispenser such as instructions. Although the product stored and dispensed by the dispenser is typically a liquid, other products are possible such as foams and powders.

Many fluid dispensers are configured to dispense product beneath the dispenser. Typically, an outlet of the dispenser is in fluid communication with a reservoir housed within the dispenser and adapted to selectively release the product contained in the dispenser beneath the dispenser. The outlet may be selectively actuated through a physical manipulation such as a pump or may be actuated through an electronic means. For example, a user may pull or push a lever to actuate a pump, or a user may place their hands under the dispenser to trigger a sensor causing the product to be dispensed through the outlet.

BRIEF DESCRIPTION OF THE DRAWINGS

In one aspect, a projector for a dispenser generally comprises a body having a cavity sized and shaped to receive at least one battery, a lens holder, and at least one dispenser attachment member for attaching the projector to the dispenser. A lens assembly is disposed in the lens holder and includes a lamp configured to project a light through the lens assembly, and a circuit board in electrical communication with the lamp.

In another aspect, a dispenser generally comprises a housing having a reservoir configured to receive a product and a mounting surface configured to be mounted to a wall. An outlet of the dispenser is in fluid communication with the reservoir and configured to selectively release a quantity of the product. A projector is secured to the housing and configured to project a light source onto the wall.

In yet another aspect, a method of projecting information on a wall generally comprises actuating a dispenser to dispense a product contained in the dispenser, and projecting a light source onto a wall on which the dispenser in mounted. The light source is emitted from a projector mounted to the dispenser.

BRIEF DESCRIPTION OF THE DRAWINGS

Figure 1:
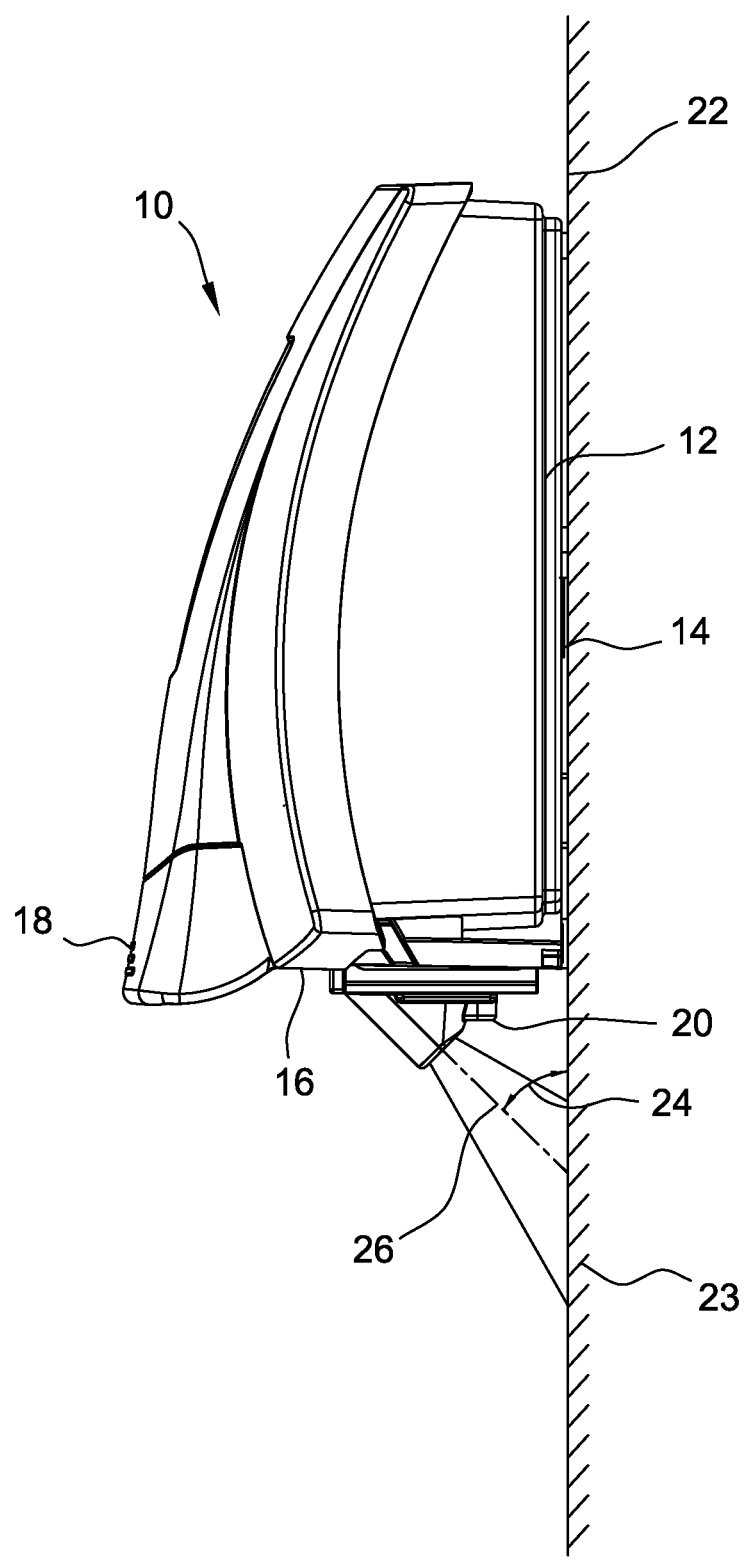

FIG. 1 is a side view of an exemplary dispenser with a projector.

Figure 2:
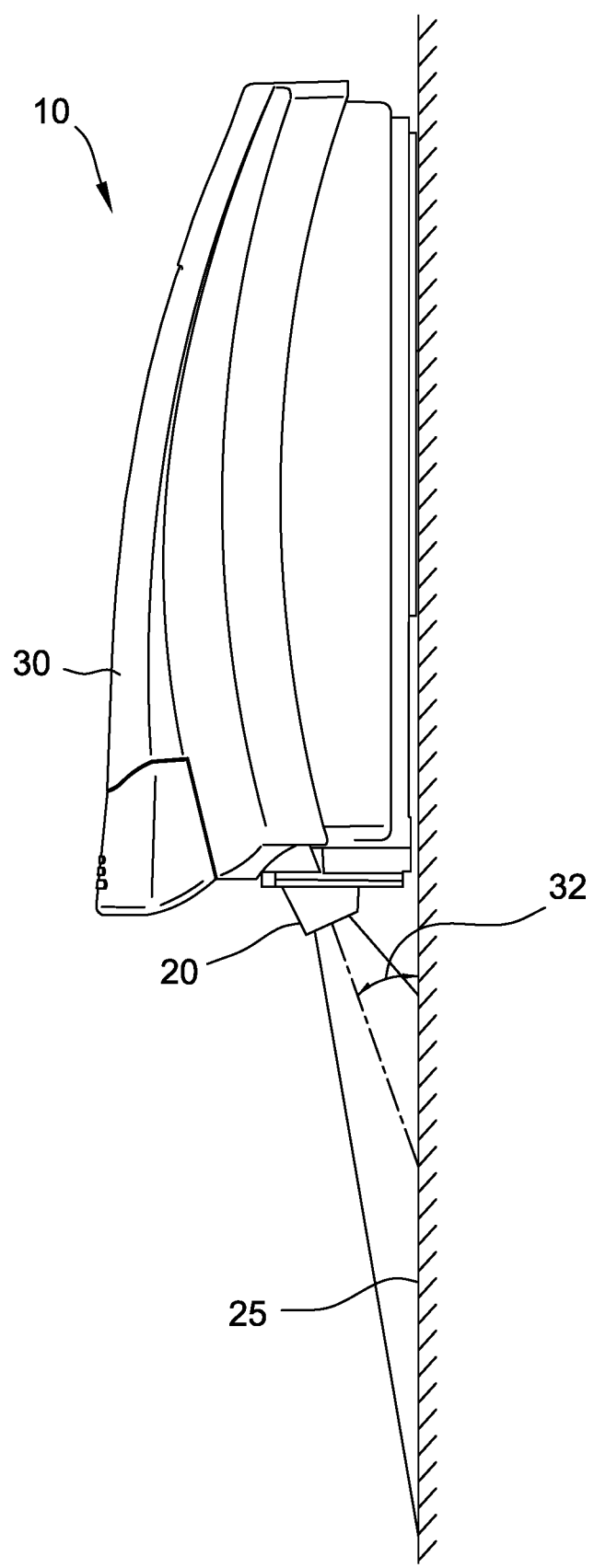

FIG. 2 is a side view of another exemplary dispenser with the projector.

Figure 3:
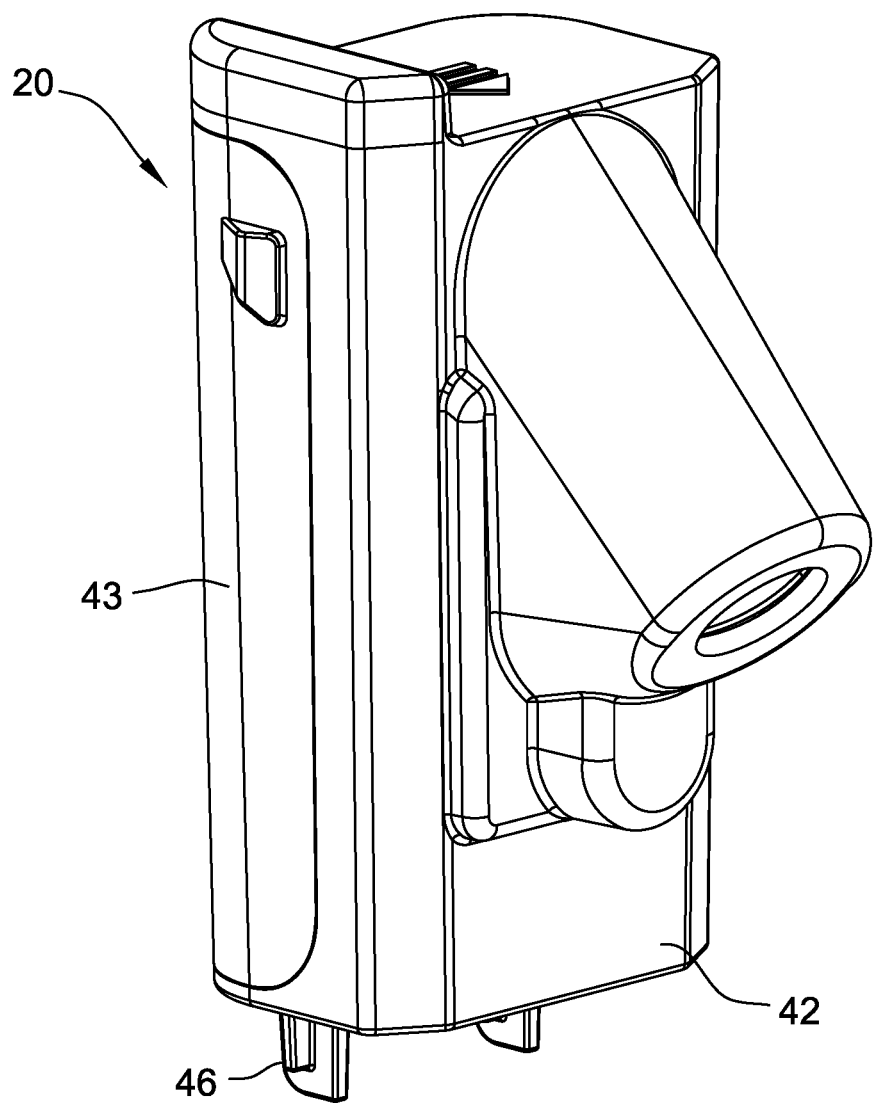

FIG. 3 is a perspective view of the exemplary projector for use with the dispensers shown in either FIG. 1 or FIG. 2.

Figure 4:
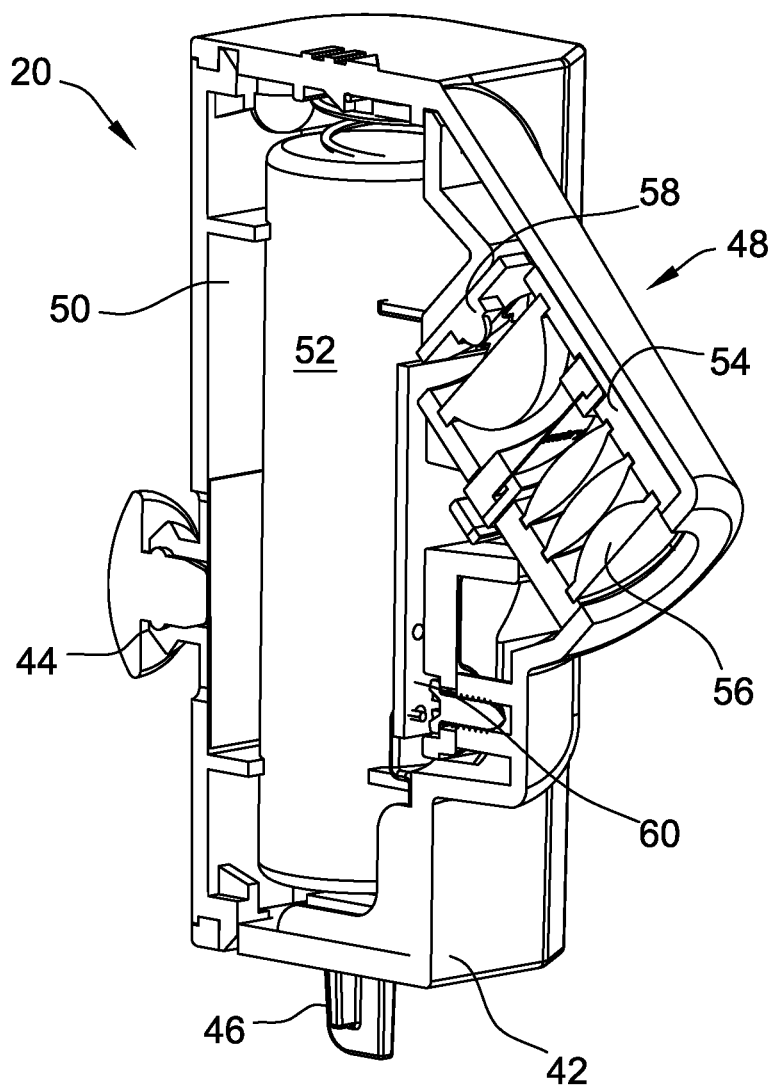

FIG. 4 is a cross-sectional view of the exemplary projector of FIG. 3.

Figure 5:
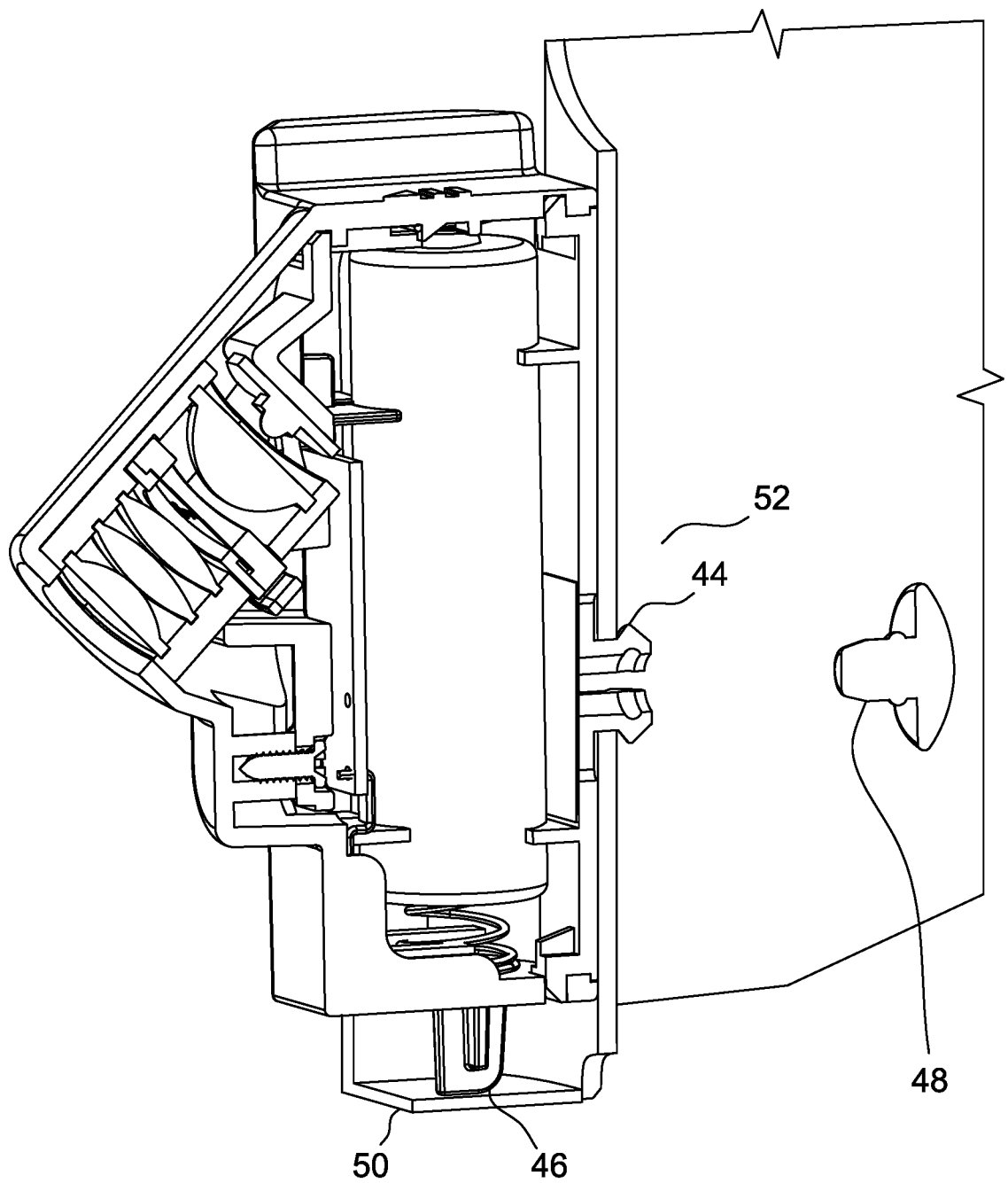

FIG. 5 is a fragmentary cross-sectional view of the exemplary projector of FIG. 3 mounted to one of the dispensers.

Figure 6:
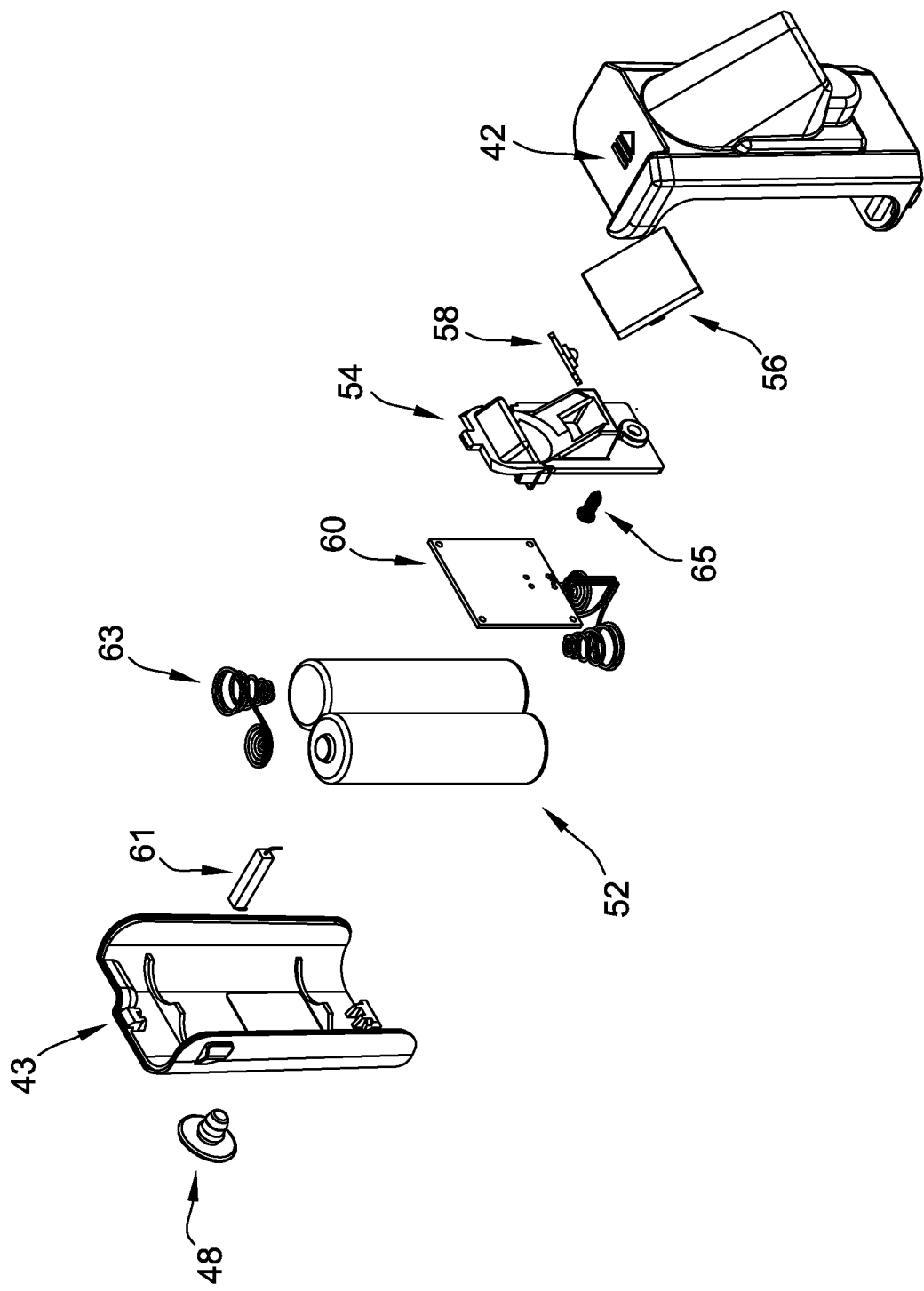

FIG. 6 is an exploded view of the exemplary projector of FIG. 3.

Figure 7:
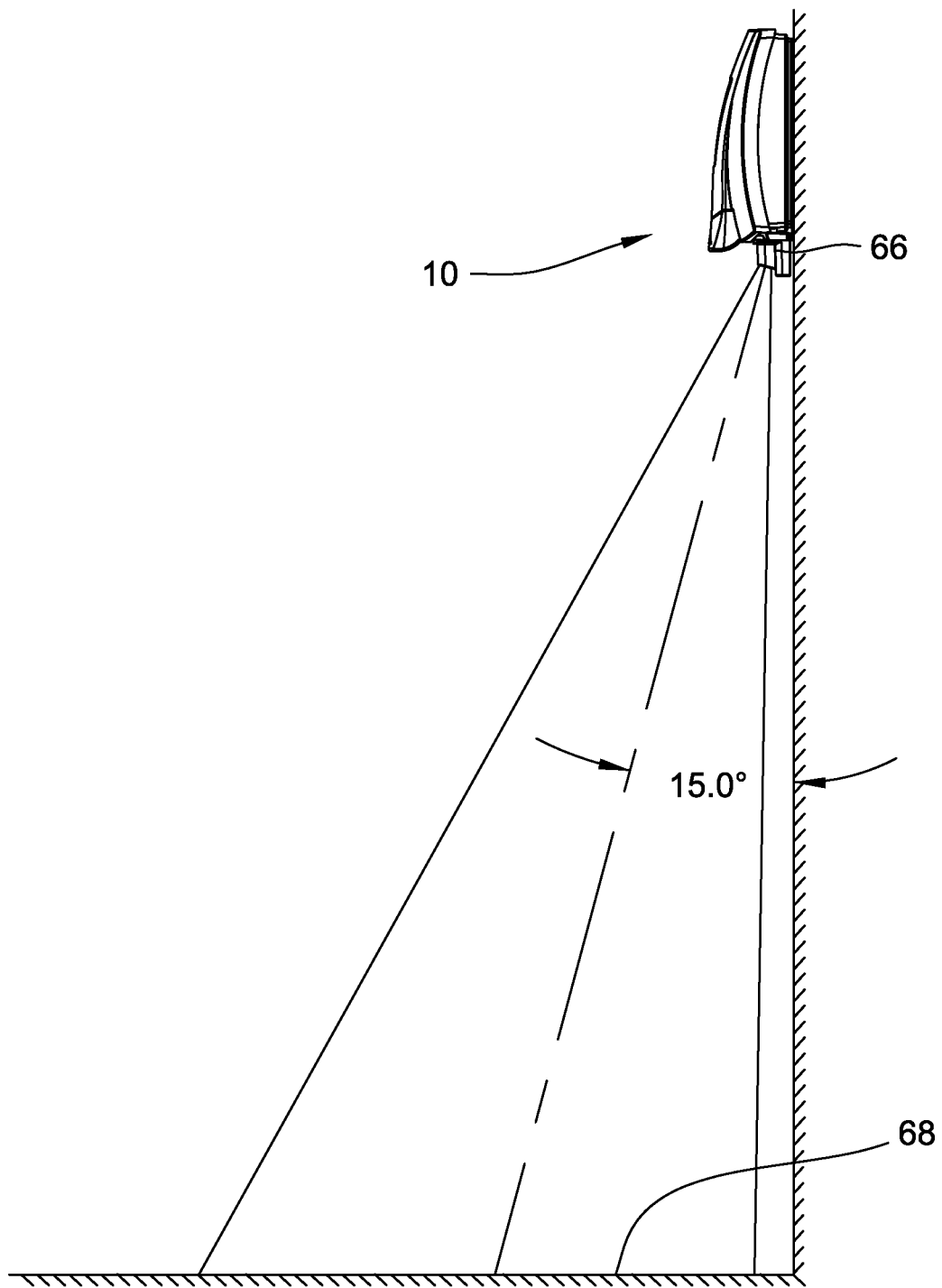

FIG. 7 is a side view of an exemplary dispenser with a projector.

FIG. 8 is a perspective view of the exemplary projector for use with the dispensers shown in FIG. 7.

FIG. 9 is a top view of the exemplary projector of FIG. 8.

FIG. 10 is a front view of the exemplary projector of FIG. 8.

FIG. 11 is a side view of the exemplary projector of FIG. 8.

Figure 12:
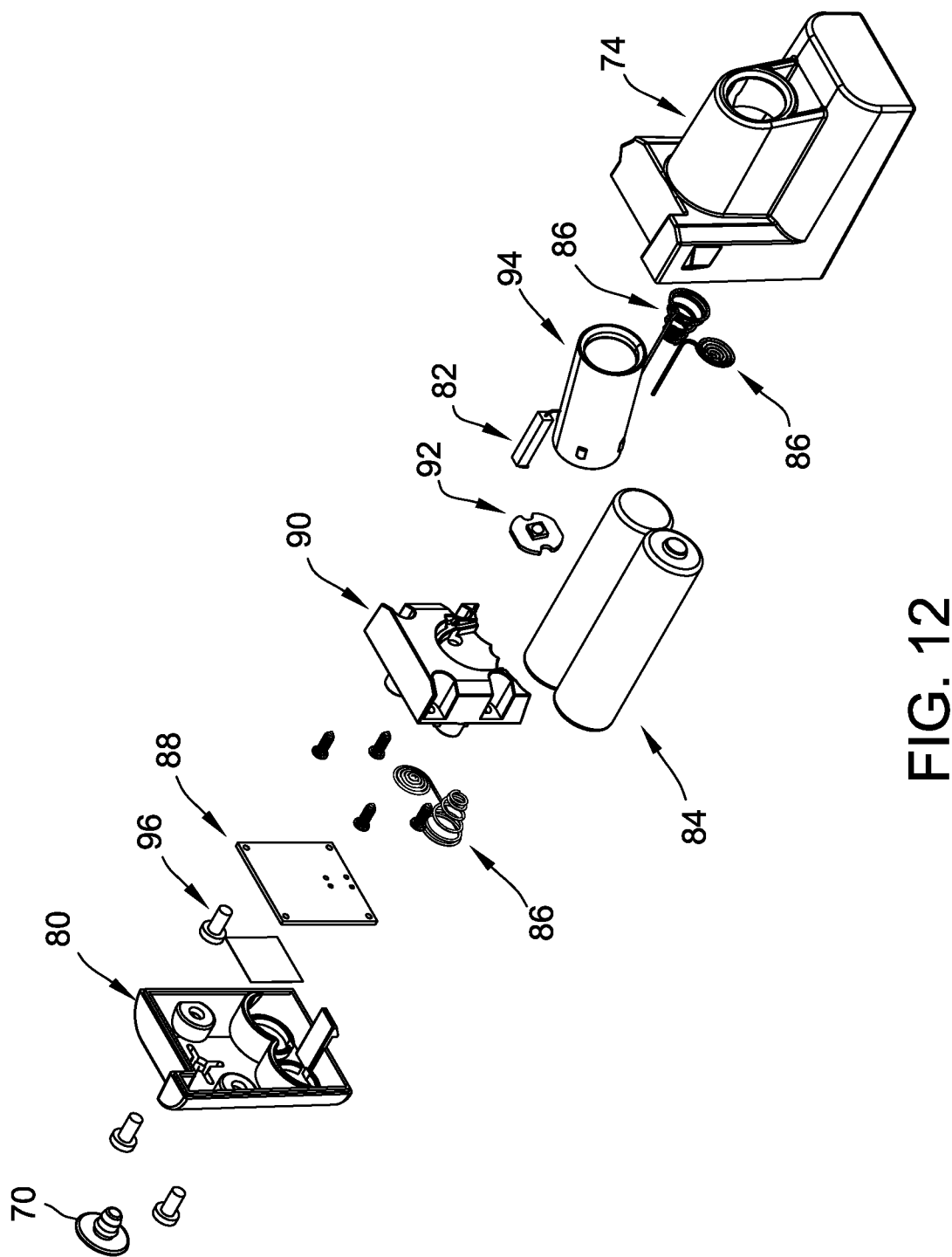

FIG. 12 is an exploded view of the exemplary projector of FIG. 8.

DETAILED DESCRIPTION

FIG. 1 illustrates a suitable embodiment of a dispenser 10 for dispensing products such as, but not limited to, liquids, foams, gels, and powders. Dispenser 10 is configured to house a product such as soap, detergent, hand sanitizer, and the like. More specifically, the product is stored in a reservoir (not shown) located within a housing 12 of dispenser 10. Housing 12 is configured to mount on a wall 22. More specifically, housing 12 as seen in FIG. 1 has a flat side 14 that is complementary to a flat surface of wall 22. That is, flat side 14 of housing 12 is configured for face-to-face engagement with the flat surface of wall 22. In one suitable embodiment, flat side 14 may include one or more cutouts (not shown) for receiving a hanger (e.g., a screw, nail, hook) fastened to wall 22. Alternatively, housing 12 may be mounted to wall 22 using other common techniques such as adhesives or other suitable fasteners. It is also contemplated that dispenser 10 can be mounted on a suitable stand.

Dispenser 10 has an outlet 16 configured to dispense product contained in the reservoir. More particularly, outlet 16 is in fluid communication with the reservoir and configured to selectively dispense product. Specifically, outlet 16 selectively dispenses a predetermined quantity of product (e.g., 0.4 ml to 1.0 ml per dispense) in response to a physical actuation by a user, such as pressing handle 18 (broadly, "an actuator") inward. The inward movement of handle 18 may open a valve or actuate a pump in order to dispense the product through outlet. In other suitable embodiments, the product may be dispensed in response to a detected condition, such as actuation of a sensor or switch 61. For example a proximity sensor may detect the close present of a user. Some embodiments may power a pump in response to the detected condition to dispense a portion of the product.

It is understood that dispenser 10 can be any suitable dispenser without departing from some aspects of this disclosure.

As illustrated in FIG. 1, a projector 20 is disposed on a lower portion of dispenser 10. In some embodiments, projector 20 may be located else ware, such as the top of the dispenser 10. That is, projector 20 can be disposed at any suitable location on the dispenser. Projector 20 is configured to project a light source and thus an image 23. In the illustrated embodiment, projector 20 is configured to project a light source at a surface to which dispenser 10 is mounted, such as wall 22 resulting in image 23. In some embodiments, the light source remains lit at all times. In other embodiments, the light source illuminates in response to a triggering event. For example, the light source can illuminate (i.e., turn on) in response to handle 18 being pressed or the outlet 16 dispensing product. Or, in other suitable embodiments, the light source may illuminate upon detection of noise or movement.

Image 23 projected by projector 20 varies dependent on application and can have any suitable brightness. By sending a lighted symbol or color, the user receives a positive reinforcement to encourage use of the product in dispenser 10. In one suitable embodiment, image 23 may be a simple light, similar to a night light for use in low light situations or to draw attention to dispenser. In other suitable embodiments, image 23 may be configured for standard or typical light situations. That is, image 23 is sufficiently bright to be readily visible under normal lighting conditions. In some embodiments, projector 20 may project image 23 with detail, such as an advertisement or instructions on wall 22. This advertisement may be advantageous compared to traditional printed media because image 23 may be more economical than printed media and is not easily defaced. It may also be simpler to change to a new advertisement by updating or changing the image. The image 23 may be a combination of text and graphics to convey the desired information. The image 23 can be the same per triggering event or can change between a plurality of images 23.

In one suitable embodiment, image 23 may convey information related to the product contained in dispenser 10. For example, dispenser 10 may have limited space for product identification and safety information. Projector 20 may project image 23 containing such information, freeing up space on dispenser 10. Or, in another embodiment, image 23 may include instructions for using the product. For example, projector 20 could project image 23 containing instructions for proper hand washing. Thus, image 23 can be directly related to the product contained within the dispenser.

Projector 20 may light in other situations as well. Dispenser 10 may have a sensor configured to detect an event such as a person moving, a toilet flushing, or water running, and project image 23 to direct attention to dispenser 10. Thus, image 23 can be used to draw attention to the dispenser and thereby remind individuals to wash their hands. In one suitable embodiment, projector 20 may project image 23 for the length of time recommended for hand washing. After the recommended time has passed, image 23 may then go dark or change. For example, the image 23 may be red for at least 20 seconds (or other suitable period of time for washing hands) and then turn green to indicate to the user of dispenser 10 that they have washed their hand for at least the recommended period of time. It is further contemplated that image 23 can be a static image, can change between multiple images, or can be a video.

In one suitable embodiment, the projector is configured to turn off after a predetermined amount of time. It is contemplated that the predetermined amount of time can be any suitable length of time.

With reference again to FIG. 1, projector 20 projects image 23 onto wall 22 at an angle. Projector 20 may have corrective lenses to correct for any keystone effects or other distortions caused by the angled projection. In some embodiments, an included angle 24 between wall 22 and a centerline 26 of projection is greater than twenty five degrees. Angles shallower than twenty-five degrees are not advised as they may cause image distortion that is difficult to correct. Thus, in suitable embodiments, the included angle 24 is greater than twenty five degrees. For example, in one suitable embodiment, the angle 24 at which the image 23 is projected onto the wall 22 is approximately forty-five degrees or greater. It is understood that the in some embodiments the image 23 can be projected onto any suitable surface. That is, the image 23 can be project onto surface besides wall 22 (e.g., a floor, a ceiling, an adjacent wall) without departing from some aspects on this disclosure.

FIG. 2 illustrates another exemplary dispenser 30 for use with the projector 20. Dispenser 30 is similar to dispenser 10 of FIG. 1, with the exception that dispenser 30 has a lower profile. Because of the lower profile, dispenser 30 must place projector 20 closer to the wall, resulting in a low included angle 32. Dispenser 30 of FIG. 2 is projecting at an angle close to about twenty five degrees. Lower included angle 32 results in a larger image 25, but it typically has more distortion than the embodiment of FIG. 1.

FIG. 3 illustrates the projector 20 removed from dispenser 10, and FIG. 4 illustrates a cross-section of projector 20. As seen in FIGS. 3 and 4, projector 20 has a body 42 with projections 44, 46 for interfacing with housing 12 of dispenser 10 and a lamp assembly 48. Body 42, in the illustrated embodiment, further includes a cavity 50 sized and shaped to receive at least one battery 52 and a lens holder 54 sized and shaped to receive at least one lens for focusing an image. Body 42 has a removable cover 43 providing access to battery 52. In other suitable embodiments, battery 52 can be separate from and spaced from body 42. In such an embodiment, a separate, discrete battery holder (not shown) sized and shaped to hold at least one battery 52 can be provided and that is operatively connected (e.g., via suitable wiring) to the body 42. The discrete batter holder can be located anywhere on dispenser 10, 30 or at a suitable location spaced from the holder.

Projector 20 has a lens assembly 56 disposed in the lens holder 54, a lamp 58 configured to project an image through lens assembly 56, and a circuit board 60 in electrical communication with lamp 58. Lamp 58 may be a white light source that is modified using colored filters to project various colors. Or, in other suitable embodiments, lamp 58 may be a white light source and a shadow filter may be used to project shapes. In still other suitable embodiments, a printed image may be disposed in lens assembly 56 for projection. In yet other suitable embodiments, lamp 58 may be a video source configured to project digital images. In one suitable embodiment, projector 20 includes memory source for storing image 23.

It is contemplated that in some suitable embodiments, image 23 can be readily changed for an external device (e.g., a computer, a smartphone, a tablet) capable of communicating with the memory source. The communication between the external device and the projector 20 to change the image(s) 23 can be wired or wireless.

FIG. 5 illustrates a cross-section of projector 20 mounted to dispenser 10. Dispenser 10 has a first wall 50 with a first recess sized and shaped to receive lower protrusion 46 (broadly, a "first dispenser attachment member"). A second wall 52 has a second recess sized and shaped to receive side protrusion 44 (broadly, a "second dispenser attachment member"). Lower protrusion 46 interfaces with first wall 12 proximate wall 22. The interaction between lower protrusion 46 and housing 12 inhibits a lower end of projector 20 from moving laterally relative to housing 12. A side protrusion 44 interfaces with housing 12 at a lateral location. Side protrusion 44 snaps into place in housing 12, further inhibiting movement of the projector 20 relative to the housing 12. Protrusion 44 has a recess that ends into housing 14. A lock pin 48 may be inserted in side protrusion 44 to expand an end of side protrusion 44, locking projector 20 to housing 12. It is contemplated that the projector 20 can be mounted to the dispenser 10 (or dispenser 30) in any suitable manner without departing from some aspects of this disclosure.

FIG. 6 illustrates an exploded view of projector 20. Projector 20 includes lock pin 48, removable cover 43, switch 61, battery 52, battery spring 63, circuit board 60, lens holder 54, lamp 58, body 42, lens assembly 56, and screw 65.

FIG. 7 illustrates dispenser 10 having an exemplary projector 66 is disposed on a lower portion of dispenser 10. Projector 66 is similar to projector 20, but is configured to project an image on floor 68 rather than wall.

FIG. 8 illustrates a perspective view of projector 66. FIG. 9 illustrates a top view of projector 66. FIG. 10 illustrates a front view of projector 66. FIG. 11 illustrates a side view of projector 66. Of note, in the exemplary embodiment of FIG. 8 through FIG. 11, projector 66 has a lock pin 70 disposed on a back side 72 of body 74 and protrusions 76 on a bottom side 78 of body 74. Protrusions 76 and locking pin 70 orient projector 66 to project an image downward. In other embodiments, different configurations of mounting mechanisms are possible and embodiments are not limited to the lock pin and protrusions described.

FIG. 12 illustrates an exploded view of projector 66. Projector 20 includes lock pin 70, removable cover 80, switch 82, battery 84, battery springs 86, circuit board 88, lens holder 90, lamp 92, body 74, lens assembly 94, and screw 96.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A projector for a dispenser, comprising:
a body having a cavity sized and shaped to receive at least one battery, a lens holder, and at least one dispenser attachment member for attaching the projector to the dispenser;
a lens assembly disposed in the lens holder;
a lamp configured to project a light through the lens assembly; and
a circuit board in electrical communication with the lamp.

2. The projector of claim 1, wherein the at least one dispenser attachment member comprises a first dispenser attachment member and a second dispenser attachment member.

3. The projector of claim 2, wherein the body has a removable cover to provide access to the cavity.

4. A projector for a dispenser, comprising:
a body having a cavity sized and shaped to receive at least one battery, a lens holder, a first dispenser attachment member, and a second dispenser attachment member, each of the first and second dispenser attachment members being configured to attach the projector to the dispenser, the body including a removable cover to provide access to the cavity;
a lens assembly disposed in the lens holder;
a lamp configured to project a light through the lens assembly; and
a circuit board in electrical communication with the lamp, wherein the first dispenser attachment member is disposed on the removable cover.

5. A dispenser, comprising:
a housing having a reservoir configured to receive a product and a mounting surface configured to be mounted to a wall;
an outlet in fluid communication with the reservoir, the outlet being configured to selectively release a quantity of the product; and
a projector secured to the housing and configured to project a light source onto the wall,
wherein the projector is selectively removable from the housing and configured to display the projected light source below the dispenser.

6. The dispenser of claim 5, wherein the light source has a centerline and wherein an included angle between the centerline and the wall is greater than twenty-five degrees.

7. The dispenser of claim 5, wherein the projector is configured to project the light source in response to a triggering event.

8. The dispenser of claim 5, wherein the light source is a graphic image.

9. The dispenser of claim 5, wherein the light source is text.

10. The dispenser of claim 5, wherein the projector is secured to the housing by a lock pin.

11. The dispenser of claim 7, wherein the projector is configured to turn off after a predetermined amount of time.

12. A dispenser, comprising:
a housing having a reservoir configured to receive a product and a mounting surface configured to be mounted to a wall;
an outlet in fluid communication with the reservoir, the outlet being configured to selectively release a quantity of the product; and
a projector secured to the housing and configured to project a light source onto the wall,
wherein the projector is configured to project the light source in response to a triggering event, and
wherein the triggering event is actuation of the dispenser to release a quantity of product from the outlet.

13. A method of projecting information on a wall, the method comprising:
actuating a dispenser to dispense a product contained in the dispenser; and
projecting a light source onto a wall on which the dispenser in mounted, the light source being emitted from a projector mounted to the dispenser,
wherein the projector actuates in response to the dispenser dispensing a product contained in the dispenser.

14. The method of claim 13, wherein the light source displays text on the wall.

15. The method of claim 13, wherein the light source is a graphic image.

* * * * *